US010866198B2

(12) United States Patent
Sakaguchi et al.

(10) Patent No.: US 10,866,198 B2
(45) Date of Patent: Dec. 15, 2020

(54) IMAGING PLATE UNIT AND APPLICATION THEREOF

(71) Applicant: FUJIFILM Corporation, Tokyo (JP)

(72) Inventors: Yasunobu Sakaguchi, Tokyo (JP); Osamu Murakami, Tokyo (JP); Yasunori Narukawa, Tokyo (JP); Tsutomu Fujino, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 556 days.

(21) Appl. No.: 15/647,751

(22) Filed: Jul. 12, 2017

(65) Prior Publication Data

US 2017/0315068 A1 Nov. 2, 2017

Related U.S. Application Data

(63) Continuation of application No. PCT/JP2016/050508, filed on Jan. 8, 2016.

(30) Foreign Application Priority Data

Feb. 23, 2015 (JP) .................................. 2015-032561

(51) Int. Cl.
*G01N 23/04* (2018.01)
*G01N 23/083* (2018.01)
(Continued)

(52) U.S. Cl.
CPC ............. *G01N 23/18* (2013.01); *G01N 23/04* (2013.01); *G01N 23/06* (2013.01); *G01N 23/083* (2013.01);
(Continued)

(58) Field of Classification Search
CPC ....... A61B 6/42; A61B 6/4208; A61B 6/4216; G01N 23/04; G01N 23/06; G01N 23/083;
(Continued)

(56) References Cited

U.S. PATENT DOCUMENTS 5,524,132 A * 6/1996 Ranadive ............. G01B 15/025
250/582
6,377,654 B1 * 4/2002 Willems ............... G01B 15/025
250/358.1
(Continued)

FOREIGN PATENT DOCUMENTS

DE 10 2011 018 955 A1 10/2012
EP 0 905 715 A1 3/1999
(Continued)

OTHER PUBLICATIONS

Communication dated Mar. 6, 2018 from the European Patent Office in counterpart application No. 16755046.6.
(Continued)

*Primary Examiner* — Allen C. Ho
(74) *Attorney, Agent, or Firm* — Sughrue Mion, PLLC (57) ABSTRACT

An IP cover having a light-shielding property is detachably mounted on an IP. The IP includes a stimulable phosphor layer on one surface thereof. The IP cover is mounted on the stimulable phosphor layer so as to be closely attached to the stimulable phosphor layer. The IP and the IP cover include notches, and a part of an inspection target is inserted into the notches at the time of inspection. An IP unit is mounted on a blade welded portion of an impeller. Radiation is applied from a radiation irradiation device and a radiation image of the blade welded portion is recorded on the IP as a latent image. The IP cover is detached from the IP unit and the IP is set on a template. The IP is set at an image reading position of a radiation image reading device by the template, and the radiation image is read.

18 Claims, 10 Drawing Sheets

(51) Int. Cl.
*G01N 23/087* (2018.01)
*G01N 23/18* (2018.01)
*G03B 42/04* (2006.01)
*G21K 4/00* (2006.01)
*G01N 23/06* (2018.01)
*G03B 42/02* (2006.01)
*G01N 23/223* (2006.01)
*G01T 1/20* (2006.01)

(52) U.S. Cl.
CPC ......... *G01N 23/087* (2013.01); *G01N 23/223* (2013.01); *G01T 1/2012* (2013.01); *G03B 42/02* (2013.01); *G03B 42/04* (2013.01); *G21K 4/00* (2013.01); *G21K 2004/02* (2013.01); *G21K 2004/04* (2013.01); *G21K 2004/06* (2013.01); *G21K 2004/10* (2013.01); *G21K 2004/12* (2013.01)

(58) Field of Classification Search
CPC .... G01N 23/087; G01N 23/18; G01T 1/2012; G03B 42/02; G03B 42/04; G21K 4/00; G21K 2004/02; G21K 2004/04; G21K 2004/06; G21K 2004/10; G21K 2004/12
USPC ....... 378/58, 59, 61, 62, 167, 177, 182, 189; 250/580–582
See application file for complete search history.

(56) References Cited

U.S. PATENT DOCUMENTS

| | | | | |
|---|---|---|---|---|
| 6,781,144 B2* | 8/2004 | Yonekawa | ............. | G03B 42/04 250/581 |
| 6,949,759 B2* | 9/2005 | Yonekawa | ............. | G03B 42/04 250/584 |
| 6,953,941 B2* | 10/2005 | Nakano | ................ | G03B 42/08 250/484.4 |
| 7,045,806 B2* | 5/2006 | Yonekawa | ............. | G03B 42/02 250/589 |
| 7,075,101 B2* | 7/2006 | Iiyama | ................... | G03B 42/02 250/580 |
| 7,087,909 B2* | 8/2006 | Collins | ................ | G03B 42/04 250/484.4 |
| 7,087,916 B2* | 8/2006 | Suzuki | ............... | C09K 11/7733 250/484.4 |
| 7,091,510 B2* | 8/2006 | Misawa | ............. | C09K 11/7786 250/484.4 |
| 7,102,143 B2* | 9/2006 | Leblans | ............. | C09K 11/7733 250/483.1 |
| 7,122,808 B2* | 10/2006 | Kudo | ................. | C09K 11/7733 250/484.4 |
| 7,165,884 B2* | 1/2007 | O'Dea | .................. | G03B 42/04 378/186 |
| 7,180,079 B2* | 2/2007 | Saito | .................... | G01T 1/2012 250/484.4 |
| 7,186,995 B2* | 3/2007 | Saito | ..................... | G03B 42/04 250/370.09 |
| 7,196,340 B2* | 3/2007 | Hagiwara | .......... | C09K 11/7733 250/484.4 |
| 7,199,379 B2* | 4/2007 | Leblans | ............. | C09K 11/7733 250/484.4 |
| 7,208,744 B2* | 4/2007 | Matsumoto | ........ | C09K 11/7733 250/484.4 |
| 7,208,745 B2* | 4/2007 | Maeda | ............... | C09K 11/7733 250/484.4 |
| 7,223,991 B2* | 5/2007 | Isoda | ................. | C09K 11/7733 250/581 |
| 7,227,157 B2* | 6/2007 | Nakatsu | ............... | C09K 11/778 250/484.4 |
| 7,242,011 B2* | 7/2007 | Nakajo | .................. | G03B 42/04 250/484.4 |
| 7,262,421 B2* | 8/2007 | Shoji | .................. | C09K 11/7733 250/484.4 |
| 7,265,371 B2* | 9/2007 | Shoji | ........................ | B32B 3/00 250/581 |
| 7,274,033 B2* | 9/2007 | Yonekawa | ............. | G03B 42/04 250/580 |
| 7,288,358 B2* | 10/2007 | Takasu | ............... | C09K 11/7733 252/478 |
| 7,315,031 B2* | 1/2008 | Fukui | ...................... | G21K 4/00 250/484.4 |
| 7,326,949 B2* | 2/2008 | Takasu | ............... | C09K 11/7733 250/484.4 |
| 7,331,710 B2* | 2/2008 | Nakajo | .................. | G03B 42/04 206/455 |
| 7,375,350 B2* | 5/2008 | Neusbul | ............... | G02B 27/023 250/484.4 |
| 7,417,237 B2* | 8/2008 | Hosoi | .................... | G03B 42/04 250/367 |
| 7,432,512 B2* | 10/2008 | Pirmann | .............. | G03B 42/045 250/484.2 |
| 7,442,943 B2* | 10/2008 | Isoda | ................. | C09K 11/7733 250/484.4 |
| 7,480,363 B2* | 1/2009 | Lasiuk | ................. | G01B 15/025 378/54 |
| 7,495,237 B2* | 2/2009 | Kudo | ..................... | G03B 42/02 250/484.4 |
| 7,514,698 B2* | 4/2009 | Isoda | ................. | C09K 11/7733 250/370.11 |
| 7,556,426 B2* | 7/2009 | Nakajo | .................. | G03B 42/04 378/182 |
| 7,605,380 B2* | 10/2009 | Maeda | ............... | C09K 11/7733 250/483.1 |
| 8,618,512 B2* | 12/2013 | Jagannathan | ............ | G21K 4/00 250/484.4 |
| 9,040,941 B2* | 5/2015 | Ishikawa | ................ | G03B 42/04 250/483.1 |
| 9,110,175 B2* | 8/2015 | Henry | ..................... | G03B 42/02 |
| 9,417,336 B2* | 8/2016 | Sakurai | ................. | G01T 1/2012 |
| 9,524,546 B2* | 12/2016 | Nagashima | ........... | G01N 23/04 |
| 10,429,324 B2* | 10/2019 | Phin | ..................... | G01N 23/083 |
| 2013/0277251 A1 | 10/2013 | Ishikawa et al. | | |

FOREIGN PATENT DOCUMENTS

| | | |
|---|---|---|
| EP | 2 657 763 A2 | 10/2013 |
| GB | 2 125 988 A | 3/1984 |
| JP | 03-127339 U | 12/1991 |
| JP | 2005-274921 A | 10/2005 |
| JP | 2010-169942 A | 8/2010 |
| JP | 2013-228469 A | 11/2013 |
| WO | 2006/038386 A1 | 4/2006 |

OTHER PUBLICATIONS

Written Opinion of the International Searching Authority of PCT/JP2016/050508 dated Mar. 1, 2016.
International Search Report of PCT/JP2016/050508 dated Mar. 1, 2016.

* cited by examiner

IMAGING PLATE UNIT AND APPLICATION THEREOF

CROSS-REFERENCE TO RELATED APPLICATIONS

This application is a Continuation of PCT International Application No. PCT/JP2016/050508 filed on Jan. 8, 2016, which claims priority under 35 U.S.C § 119(a) to Japanese Patent Application No. 2015-032561 filed on Feb. 23, 2015. Each of the above application(s) is hereby expressly incorporated by reference, in its entirety, into the present application.

BACKGROUND OF THE INVENTION

1. Field of the Invention

The present invention relates to an imaging plate unit and the application thereof (a radiographic imaging apparatus, a radiographic imaging method, and a template).

2. Description of the Related Art

There is known a phosphor that accumulates a part of radiation energy when being irradiated with radiation (X-ray, α-ray, β-ray, γ-ray, electron beam, ultraviolet ray, and the like), and generates stimulable luminescence corresponding to the accumulated energy when being irradiated with excitation light, such as visible light, thereafter. The phosphor is called a storage phosphor (stimulable phosphor), and is used for various purposes, such as a medical purpose.

For example, Fuji Computed Radiography FCR (registered trademark) manufactured by Fuji Film Co., Ltd. is known as a radiation image recording/reading system that uses a storage phosphor sheet (imaging plate, hereinafter referred to as IP) including a film made of the above-mentioned storage phosphor (for example, JP2005-274921A).

In the radiation image recording/reading system, generally, an IP is used while being housed in a light-shielding property case called a cassette. Then, the cassette is irradiated with an X-ray or the like passing through a subject, such as a human body, so that the radiation image of the subject is taken on the IP. The radiation image is recorded on the IP as a latent image by the taking of the radiation image. After the radiation image is taken, the IP is two-dimensionally scanned with excitation light, such as red laser light, so that stimulable luminescence is generated. This luminescence is photoelectrically read to obtain an image signal, and an image reproduced on the basis of the image signal is stored as a digital image file and is displayed on a liquid crystal display. Further, the image is output as a radiation image by a printer as necessary. The IP having been subjected to stimulable luminescence is irradiated with erasing light generated from an erasing light source, so that information about the radiation image remaining in the IP is erased.

Further, in a case in which an inspection target, such as a welded portion between pipes that are welded to each other while abutting each other in an axial direction thereof, is not flat, a flexible IP is housed in a flexible bag and an image is taken, while being closely attached to the outer peripheral surface of the inspection target, to obtain a radiation image.

SUMMARY OF THE INVENTION

Since information about the radiation image remaining in the IP is erased when the IP is irradiated with erasing light, the IP can be reused. For this reason, in the related art, there has been a demand for the use of an IP even in the field of non-destructive inspection, which uses a radiation film, and the like.

However, if a subject surface (inspection surface) is curved even though an IP is tried to be used, the IP cannot be curved along the subject surface in a method using a cassette in the related art. For this reason, an accurate radiation image is not obtained.

Further, in the case of the inspection of a portion, which is not flat, such as a welded portion between pipes abutting each other, a radiation image is taken in a state in which an IP is housed in a light-shielding housing bag. After the radiation image is taken, the IP is taken out of the light-shielding housing bag and is set in a reading device and the radiation image is read. For this reason, whenever the radiation image is read, the IP needs to be put in and taken out of the light-shielding housing bag. Accordingly, there is a problem that an intended image cannot be read due to the erroneous determination of the surface and back of the IP at the time of work in a darkroom or the durability of the IP deteriorates due to the scratch of the IP while the IP is put in and taken out of the light-shielding housing bag. Particularly, in a case in which an IP has a special shape, it is not easy to put the IP in the light-shielding housing bag and to take the IP out of the light-shielding housing bag and the IP is likely to be scratched. Further, since the reading device is designed on the premise that the reading device reads a rectangular shape IP, a template corresponding to the shape of an IP needs to be used to stably read an IP having a special shape without trouble in a case in which an IP is to be set in the reading device.

An object of the invention is to provide an imaging plate unit of which operatability for allowing a surface and a back to be easily determined even in the case of work in a darkroom is improved and durability is improved by suppressing the occurrence of scratch, and the application thereof.

An IP unit of the invention comprises an IP that includes a stimulable phosphor layer on one surface thereof and has a shape allowing the imaging plate to be mounted on an inspection target so as to be closely attached to the inspection target, and an IP cover that is attachably and detachably mounted on the IP so as to be closely attached to a surface of the stimulable phosphor layer of the imaging plate and has a light-shielding property, in which the IP and the IP cover include notches into which a part of the inspection target is inserted, and in which the stimulable phosphor layer is closely attached to the inspection target with the imaging plate cover interposed between the stimulable phosphor layer and the inspection target in a state in which a part of the inspection target is inserted into the notches. Here, "close attached" is enough as long as the inspection of the inspection target is appropriately performed, and the IP does not need to be closely attached to the inspection target perfectly.

Further, it is preferable that the IP cover includes a cover body having the same outer shape as the IP, and a folded portion extending from the cover body and allowing a part of an outer peripheral edge of the IP to be sandwiched by the folded portion and the cover body. It is preferable that the IP includes an abutting end portion, the IP cover includes a receiving portion receiving the abutting end portion, and the IP cover and the IP overlap each other and are positioned in a state in which the abutting end portion abuts against the receiving portion.

It is preferable that the inspection target is formed of a magnetic body and the IP unit further comprises a magnet layer provided on a surface of the imaging plate opposite to the stimulable phosphor layer. Further, it is preferable that the IP unit further comprises a radiation absorbing plate mounted on the magnet layer so as to be closely attached to the magnet layer. Furthermore, it is preferable that the IP unit further comprises a pressing plate mounted on the surface of the IP opposite to the stimulable phosphor layer so as to be closely attached to the IP. Moreover, it is preferable that the IP unit further comprises a radiation absorbing plate mounted on a surface of the pressing plate opposite to the IP so as to be closely attached to the pressing plate. It is preferable that the inspection target is formed of a magnetic body and the radiation absorbing plate has a magnetic force, so that the IP cover is closely attached to an inspection area.

A radiographic imaging apparatus of the invention comprises the IP unit, and a radiation irradiation device that irradiates the inspection target with radiation and takes a radiation image on the IP by radiation having passed through the inspection target. Further, a radiographic imaging method of the invention comprises irradiating an inspection target with radiation applied from a radiation source by using the IP unit, and taking a radiation image on the IP by radiation having passed through the inspection target.

A template of the invention comprises a base plate, an IP-positioning portion that positions one or a plurality of the IPs, of which radiation images are taken by using the IP unit, on the base plate, and an IP presser that presses a part of an outer peripheral edge of the IP positioned by the IP-positioning portion. It is preferable that the IP presser includes a fixed plate portion mounted on the base plate and a movable plate portion mounted on the fixed plate portion so as to freely oscillate and displaced between a closed state in which the movable plate portion presses a part of the outer peripheral edge of the IP and an open state in which the movable plate portion is retreated from a part of the outer peripheral edge of the IP. Further, it is preferable that the base plate is formed of a magnetic body and the movable plate portion is formed of a magnet.

According to the invention, since an IP cover is attachably and detachably mounted on an IP so as to be closely attached to a stimulable phosphor layer, it is determined that the side of the IP to which the IP cover has been closely attached is the stimulable phosphor layer. Accordingly, an imaging plate unit, of which operatability for allowing a surface and a back of the IP to be easily and reliably determined even in the case of work in a darkroom is improved and durability is improved by suppressing the occurrence of scratch, is obtained.

DESCRIPTION OF THE PREFERRED EMBODIMENTS

Figure 1:
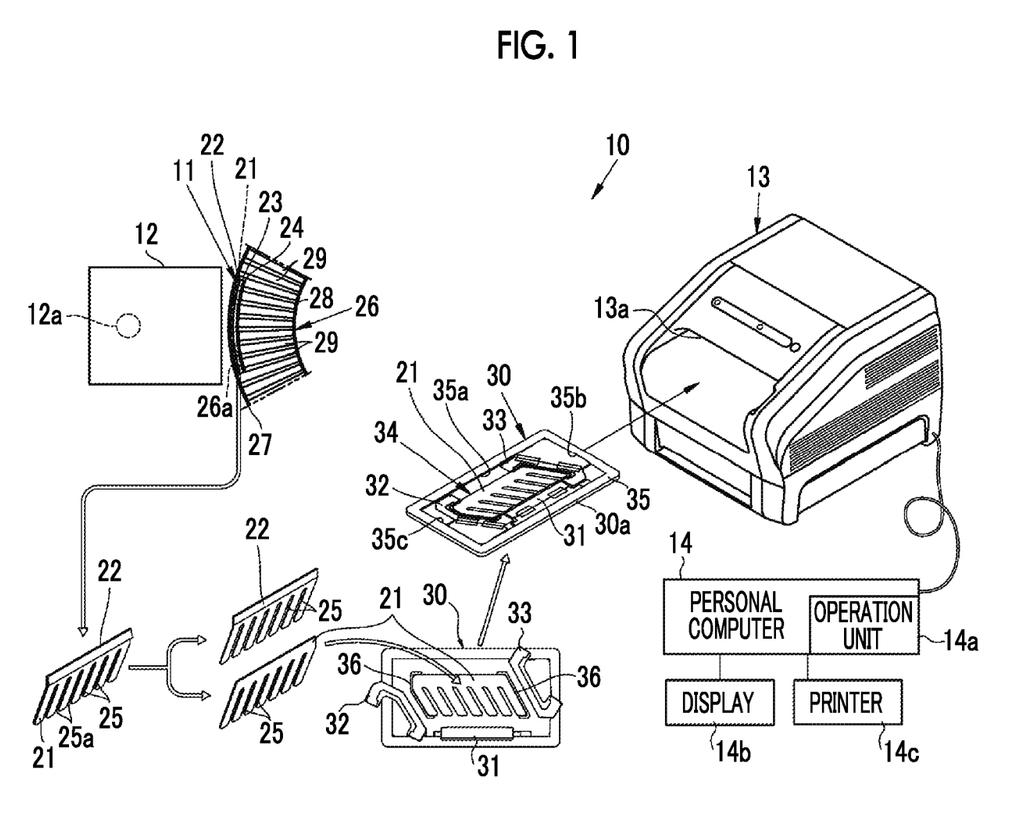
FIG. 1 is a schematic diagram showing a radiographic imaging system of the invention.
Figure 2:
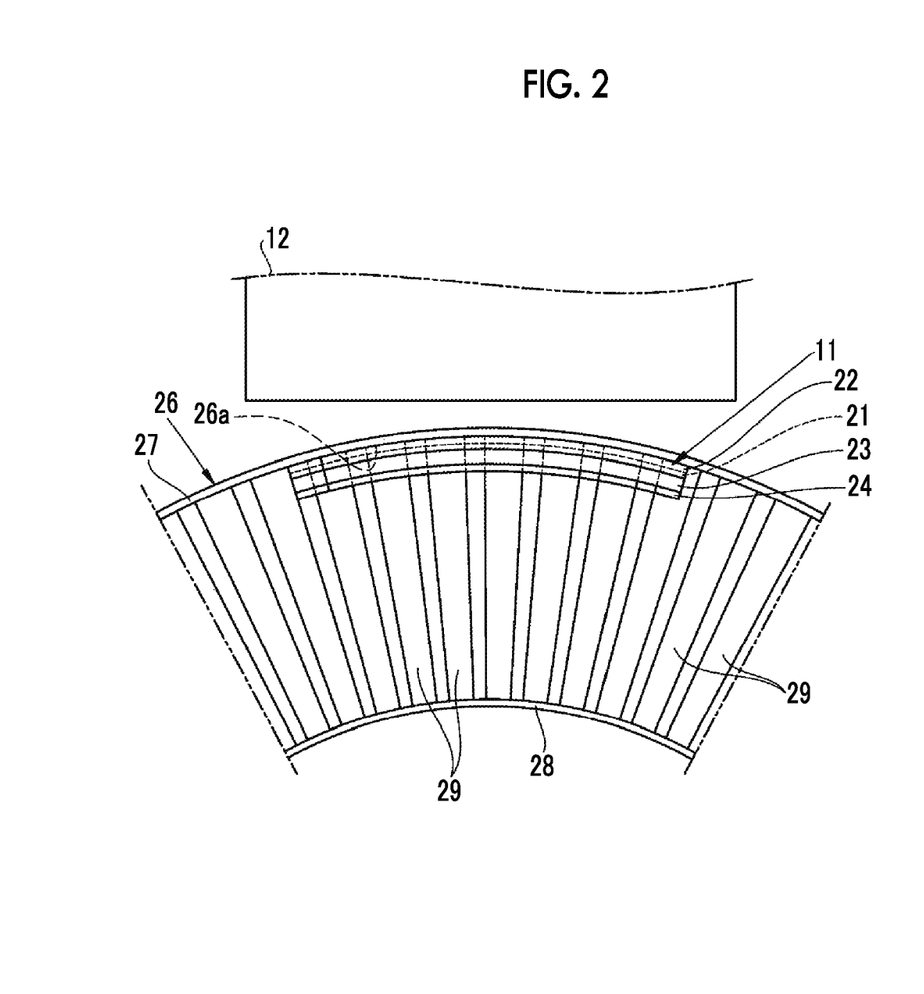
FIG. 2 is a plan view showing a state in which a blade welded portion is radiographed by an IP unit of a first embodiment.
Figure 3:
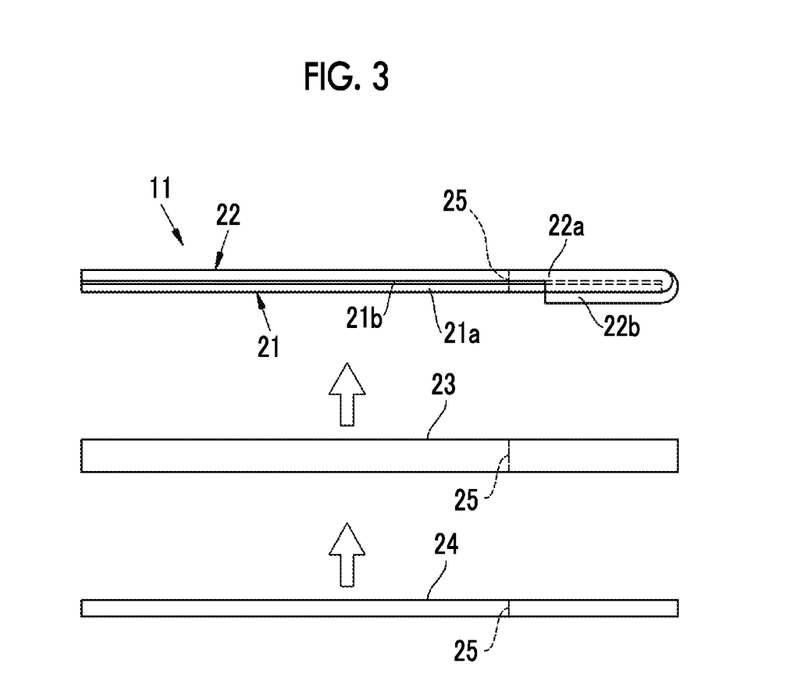
FIG. 3 is an exploded side view of the IP unit.

As shown in FIG. 1, a radiographic imaging system 10 of the invention includes an IP unit 11, a radiation irradiation device 12, a radiation image reading device 13, and a personal computer 14. As shown in FIGS. 2 and 3, the IP unit 11 includes an IP 21, an IP cover 22, a pressing plate 23, and a radiation absorbing plate 24, and the IP unit 11 is mounted on an inspection target, for example, a blade welded portion 26a of an impeller 26 of a turbine so as to be closely attached to the inspection target. The IP unit 11 and the radiation irradiation device 12 form a radiographic imaging apparatus, and a radiographic imaging method is performed by the IP unit 11 and the radiation irradiation device 12. The IP unit 11 includes the IP 21 and the IP cover 22 as the minimum components, and the pressing plate 23 and the radiation absorbing plate 24 are added to the minimum components as necessary.

The impeller 26 includes an outer cylinder 27 and an inner cylinder 28, which are concentrically disposed, and a plurality of blades 29. The plurality of blades 29 are radially arranged in a circumferential direction between the outer cylinder 27 and the inner cylinder 28. One end of each blade 29 is fixed to the inner peripheral surface of the outer cylinder 27 by welding, and the other end thereof is fixed to the outer peripheral surface of the inner cylinder 28 by welding. The impeller 26 is used for a jet engine, a turbine of a generator, and the like. When a weld defect, such as a crack, is present in a blade welded portion 26a of each blade 29, the blade 29 has a problem as a product. For this reason, the blade welded portion 26a is subjected to non-destructive inspection in a manufacturing step.

Figure 4:
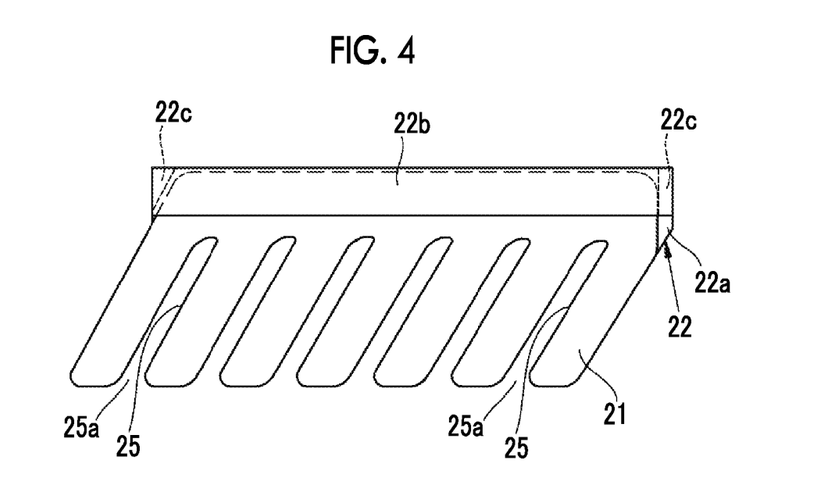
FIG. 4 is a plan view of an IP, which is covered with an IP cover, seen from the back.
Figure 5:
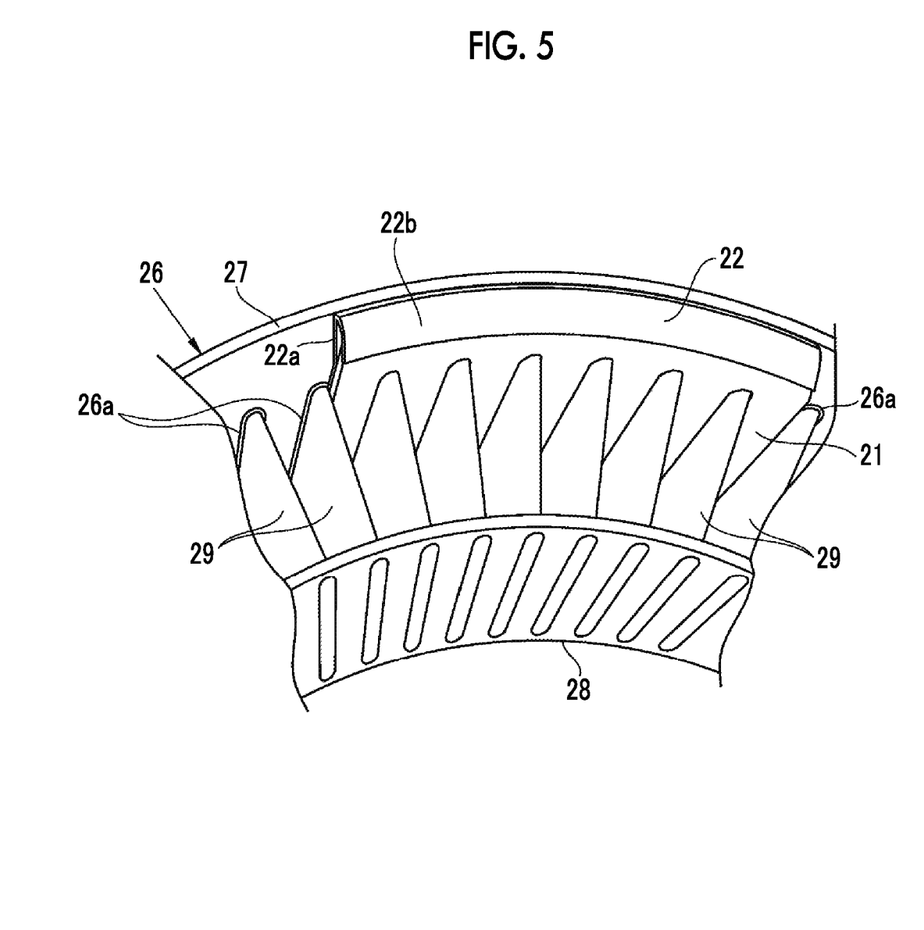
FIG. 5 is a perspective view showing a state in which the IP is mounted on the blade welded portion.

As shown in FIGS. 3 to 5, the IP 21, the IP cover 22, the pressing plate 23, and the radiation absorbing plate 24 are formed so as to have the same outer shape, that is, a substantially rectangular shape. Notches 25 into which the respective blades 29 are to be inserted with no gap are formed at one long side of each of the IP 21, the IP cover 22, the pressing plate 23, and the radiation absorbing plate 24.

A plurality of, for example, six notches 25 are formed so as to be arranged so that the respective blade welded portions 26a can be efficiently inspected. The shape of the notch 25 is the same as the outer shape of the cross-section of the blade 29, and the blade 29 is put in from a notch opening portion 25a and is inserted into the notch 25 until one end portion of the blade 29 comes into contact with the innermost portion of the notch 25.

As shown in FIG. 3, the IP 21 includes a stimulable phosphor layer 21b that is provided on one surface of a plate body 21a formed of a flexible light-shielding sheet. PET (polyethylene terephthalate), PEN (polyethylene naphthalate), polyimide, or the like is used for the plate body 21a, and glass, ceramics, carbon, aluminum, or a thin film or a composite film thereof is used for the plate body 21a instead of or in addition to PET (polyethylene terephthalate), PEN (polyethylene naphthalate), polyimide, or the like. For example, CsBrEu is used for the stimulable phosphor layer 21b, and the stimulable phosphor layer 21b is formed on one surface of the plate body 21a. Alkali halide-based storage phosphor, other storage phosphors, or the like are preferably used for the stimulable phosphor layer 21b.

The IP cover 22 is a thin light-shielding plate. For example, PET (polyethylene terephthalate), PEN (polyethylene naphthalate), polyimide, or the like is used for the IP cover 22, and glass, ceramics, carbon, aluminum, or a thin film or a composite film thereof is used for the IP cover 22 instead of or in addition to PET (polyethylene terephthalate), PEN (polyethylene naphthalate), polyimide, or the like. A light-shielding property is given to the IP cover 22 by a dye, a pigment, or the like.

As shown in FIG. 4, the IP cover 22 includes a cover body 22a and a folded portion 22b. The cover body 22a is formed in substantially the same rectangular shape as the IP 21, and the folded portion 22b is formed along the long side that is opposite to the side at which the notch opening portions 25a are formed. The folded portion 22b extends from the cover body 22a, and is folded at 180° by a fold line. One end portion of the IP 21 is sandwiched by the folded portion 22b and the cover body 22a, and the folded portion 22b and the cover body 22a overlap each other and are integrated with each other so as to be closely attached to each other. Both end portions of the folded portion 22b are welded or fixed, and connection portions 22c are formed by welded portions of the folded portion 22b. A receiving portion is formed by the connection portions 22c and the fold line. One end portion of the IP 21 is held as an abutting end portion by the receiving portion, so that the IP 21 is positioned on the IP cover 22. Since the IP 21 is positioned on the IP cover 22, the notches 25 of both the IP 21 and the IP cover 22 overlap each other so as to correspond to each other. Further, the IP 21 is attachably and detachably held by the folded portion 22b.

The pressing plate 23 is made of a porous foam material or an elastomer, such as rubber. The pressing plate 23 is used while being closely attached to the back of the IP 21.

The radiation absorbing plate 24 has a two-layer structure that includes a magnet layer and a radiation absorbing layer, and is used while being closely attached to the outer surface of the pressing plate 23 (the surface opposite to the surface of the pressing plate 23 that is closely attached to the IP 21). The magnet layer has a magnetic force, and biases the radiation absorbing plate 24 toward the outer cylinder 27 that is a magnetic body. A lead plate that has a high radiation absorption coefficient and a thickness in the range of, for example, 0.1 mm to 3 mm, or a member that is formed in the shape of a sheet by solidifying powder of a material having a high radiation absorption coefficient, such as lead powder, lead oxide powder, or tungsten powder, with a resin is used as the radiation absorbing layer. In a case in which the impeller 26, which is an object to be inspected, is formed of a magnetic body, the radiation absorbing plate 24 is closely attached to the outer cylinder 27 of the impeller 26 by a magnetic force. Accordingly, the IP 21 is pressed against the blade welded portion 26a with the IP cover 22 interposed therebetween through the pressing plate 23. As a result, the IP 21 is in a state in which the IP 21 is closely attached to the blade welded portion 26a that is an inspection area. The radiation absorbing plate 24 may include one layer in which magnet powder, lead powder, and the like are mixed, instead of the two-layer structure that includes the magnet layer and the radiation absorbing layer.

As shown in FIG. 1, the radiation irradiation device 12 includes a radiation source 12a that applies, for example, an X-ray as radiation. The radiation irradiation device 12 irradiates the blade welded portion 26a, on which the IP unit 11 is mounted, with an X-ray applied from the radiation source 12a.

A radiation image, which has passed through the blade welded portion 26a, is recorded on the IP 21 as a latent image by irradiation using an X-ray applied from the radiation irradiation device 12. Further, radiation, which has passed through the IP 21, is absorbed by the radiation absorbing plate 24. Accordingly, the formation of a virtual image on the stimulable phosphor layer 21b, which is caused by backscattering, is prevented and the leakage of radiation to the rear side of the IP unit 11 is prevented. The IP 21 on which the radiation image has been recorded is detached from the blade welded portion 26a. After that, the IP 21 is set on the template 30 so that the stimulable phosphor layer 21b faces the front in a darkroom in a state in which the IP cover 22 is removed. The IP 21 is inserted into the radiation image reading device 13 from an insertion opening 13a of the radiation image reading device 13 by using the template 30. Since the IP cover 22 is attachably and detachably mounted on the stimulable phosphor layer 21b so as to be closely attached to the stimulable phosphor layer 21b as shown in FIG. 3, a user grasps that the side of the IP 21 to which the IP cover 22 has been closely attached is the stimulable phosphor layer 21b by groping. Accordingly, the user can set the IP 21 on the template 30 so that the stimulable phosphor layer 21b faces the upper side without making an error in setting the surface and the back of the IP 21 even in the case of dark-room work.

As well known, the radiation image reading device 13 irradiates the IP 21 with excitation light, photoelectrically reads stimulable luminescence generated from the IP 21, and obtains image signals by actualizing the radiation image recorded as a latent image. The obtained image signals are sent to the personal computer 14. The personal computer 14 includes an operation unit 14a, such as a keyboard and a mouse, and a display 14b and a printer 14c are connected to the personal computer 14. The personal computer 14 displays the image signals of the radiation image on the display 14b. Further, the personal computer 14 prints the radiation image by using the printer 14c as necessary.

Since the radiation image reading device 13 is adapted to read the IP that is housed in a cassette (not shown), the radiation image reading device 13 is not adapted to directly read the IP 21. For this reason, the IP 21 is set in the radiation image reading device 13 by using the template 30.

Figure 6:
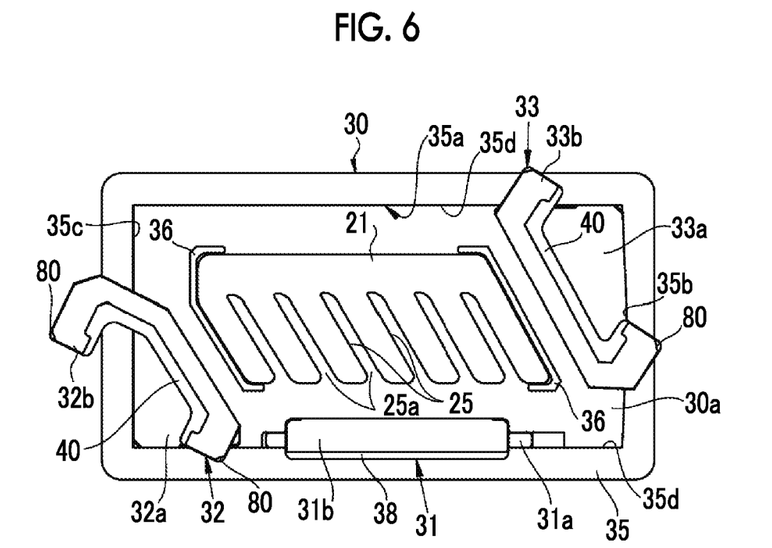
FIG. 6 is a plan view showing a state in which an IP presser is opened and the IP is set to a template.
Figure 7:
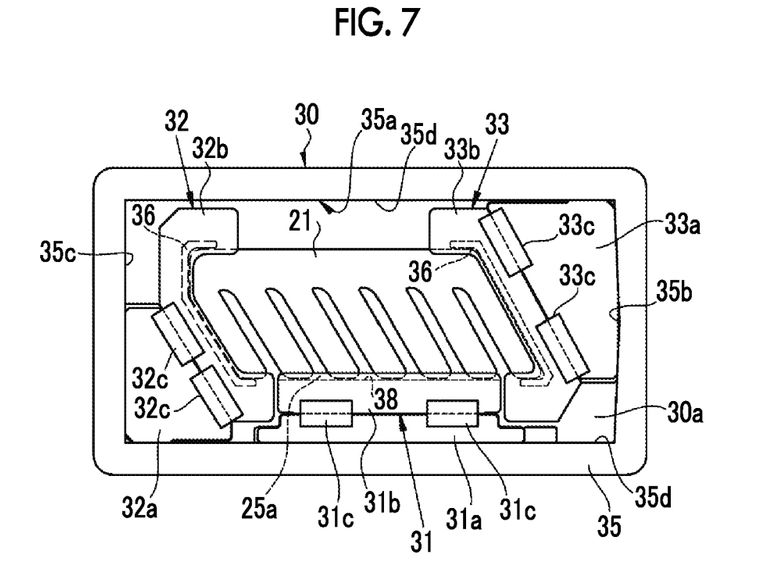
FIG. 7 is a plan view showing a state in which the IP is set to the template and the IP presser is closed.

As shown in FIGS. 6 and 7, the template 30 includes an IP positioning portion that is formed of a base plate 30a, first to third IP pressers 31 to 33, and a pair of guide pieces 36.

The base plate 30a is a flat plate that is formed of a magnetic body, for example, a rectangular thin steel plate, and includes an outer frame 35 and the guide pieces 36. The outer frame 35 includes a rectangular window 35a having short sides 35b and 35c and long sides 35d, and is attached to the outer peripheral edge portion of the base plate 30a.

One short side 35b is formed in a V shape protruding slightly outward in comparison with the other short side 35c having a linear shape. A user can set the template 30 to the insertion opening 13a of the radiation image reading device 13 so that the insertion direction (transport direction) of the template 30 is always constant, by identifying the apex of the V-shaped short side 35b with fingers. Accordingly, since the radiation image reading device 13 can always read an image from the IP 21 in the same direction, rotation, such as the inversion of an image, does not need to be performed. A portion, which can specify the insertion direction (transport direction) of the template, may be anything without being limited to the V-shaped short side 35b. For example, a linear short side may be used instead of the V-shaped short side 35b. In this case, it is preferable that a mark specifying the transport direction of the template is given to one short side. It is preferable that any of a hole, an opening, a notch, and the like is used as the mark so that a user can identify the mark in a darkroom by groping, and the mark to be given may be positioned at any of the front end or the rear end of the template 30 in the insertion direction. In FIG. 1, the template 30 is inserted into the insertion opening 13a so that the V-shaped short side 35b is positioned on the front end side. However, on the contrary, the template 30 may be inserted into the insertion opening 13a so that the V-shaped short side 35b is positioned on the rear end side. Further, in FIG. 1, the template 30 has been set to the insertion opening 13a of the radiation image reading device 13 in a state in which the IP 21 faces the upper side. However, in the case of a type in which a reading surface for the IP 21 is reversed, on the contrary to FIG. 1, the template 30 is set to the insertion opening 13a of the radiation image reading device 13 in a state in which the IP 21 faces the lower side.

The guide pieces 36 are formed in a substantially U shape so as to hold both end portions of the IP 21, and a pair of guide pieces 36 is provided. The guide pieces 36 face each other inward, and are attached near the central portion of the base plate 30a. Since the IP positioning portion is formed of the pair of guide pieces 36, both end edges of the IP 21 are in contact with the guide pieces 36 and the IP 21 is positioned on the base plate 30a. Since the guide pieces 36 are attached to the base plate 30a and protrude from the base plate 30a, a user can also identify the guide pieces 36 by groping. Accordingly, the IP 21 can be reliably mounted on the template 30 in a darkroom.

The first IP presser 31 includes a first fixed plate portion 31a, a first movable plate portion 31b, and hinge tapes 31c, and is to press a portion of the IP 21 corresponding to the notch opening portions 25a. The first fixed plate portion 31a is fixed to the base plate 30a. The first movable plate portion 31b is joined to the first fixed plate portion 31a through the hinge tapes 31c. The hinge tapes 31c hold the first movable plate portion 31b so that the first movable plate portion 31b can freely oscillate, and the first movable plate portion 31b is displaced between an open state (see FIG. 6) in which the first movable plate portion 31b is retreated from the pair of guide pieces 36 and a closed state (see FIG. 7) in which the first movable plate portion 31b covers a part of the pair of the guide pieces 36 and prevents the separation of the IP 21. A holding portion 38, which is reduced in thickness by the thickness of the IP 21, is formed on the back of the first IP presser 31. An edge portion of the IP 21 corresponding to the notch opening portion 25a is housed in the holding portion 38 when the first IP presser 31 is in a closed state.

The second IP presser 32 presses one end portion of the IP 21 and the third IP presser 33 presses the other end portion of the IP 21. The second IP presser 32 includes a second fixed plate portion 32a, a second movable plate portion 32b, and hinge tapes 32c, and the third IP presser 33 includes a third fixed plate portion 33a, a third movable plate portion 33b, and hinge tapes 33c. The second movable plate portion 32b and the third movable plate portion 33b are formed in a substantially U shape so as to correspond to the shapes of the end portions of the IP 21. A holding portion 40 is provided on the back of each of the movable plate portions 32b and 33b, and the guide pieces 36 and the edge portions of the IP 21 are housed in the holding portions 40 when the respective movable plate portions 32b and 33b are in a closed state. Since each of the movable plate portions 31b, 32b, and 33b is formed of a magnet plate having a magnetic force, the IP 21 can be closely attached to the base plate 30a by a magnetic force in the closed state. In this way, three sides of the substantially rectangular IP 21 can be reliably pressed by the respective IP pressers 31 to 33.

A pair of transport rollers (not shown) is provided in the insertion opening 13a of the radiation image reading device 13. The pair of transport rollers transports the template 30 while the template 30 is sandwiched between the pair of transport rollers, and sends the template 30 toward an image reading position. The pair of transport rollers is provided at a position where the pair of transport rollers is not in contact with the IP 21 held by the template 30, for example, at a position where the pair of transport rollers is in contact with the outer frame 35. Accordingly, since the pair of transport rollers is not in contact with the stimulable phosphor layer 21b of the IP 21, damage to the IP 21 is suppressed.

Figure 8:
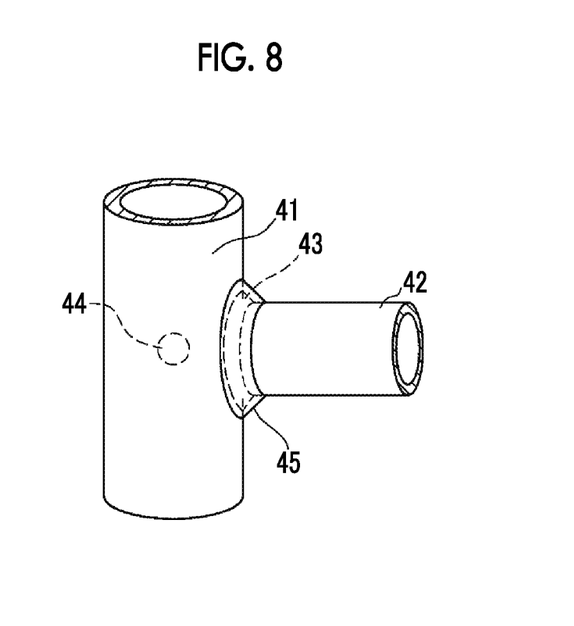
FIG. 8 is a perspective view showing a state in which radiography is performed by a C-type IP of a second embodiment.
Figure 9:
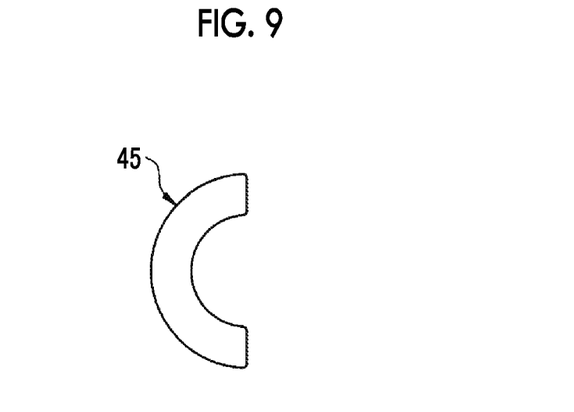
FIG. 9 is a plan view showing an example of the C-type IP of the second embodiment.
Figure 10:
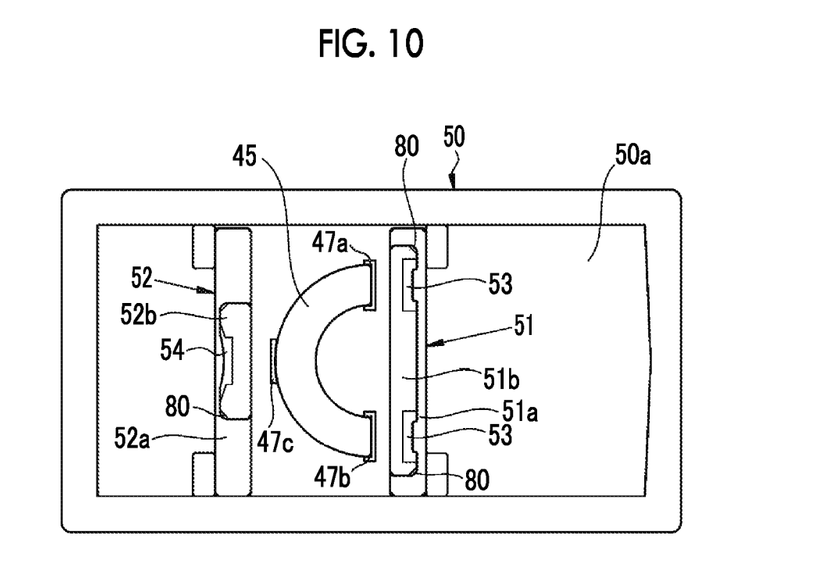
FIG. 10 is a plan view showing a state in which an IP presser is opened and the C-type IP of the second embodiment is set to a template.

In the first embodiment, the IP 21, which inspects the blade welded portion 26a of the impeller 26 of the turbine, has been described by way of example. However, the outer shape of the IP 21 is illustrative, and IPs having various outer shapes may be used so as to correspond to portions to be inspected. The notches 25 have been formed at the IP unit 11, but the notches 25 may be omitted. For example, in a case in which a welded junction 43 where a second pipe 42 is joined to the outer peripheral surface of a first pipe 41 is to be radiographed as in a second embodiment shown in FIG. 8, a C-type IP 45 shown in FIG. 9 or a crescent-shaped IP (not shown) or the like is used and a radiation source 44 is disposed in the first pipe 41. In this case, a template 50 holding a C-type IP 45 is used as shown in FIGS. 10 and 11.

The template 50 has basically the same structure as the template 30, and is different from the template 30 in that the template 50 includes both end guide pieces 47a and 47b and a middle guide piece 47c serving as an IP positioning portion corresponding to the C-type IP 45 and IP pressers 51 and 52. Both the end guide pieces 47a and 47b are formed in a U shape, are in contact with both ends of the C-type IP 45, and hold both ends of the C-type IP 45. The middle guide piece 47c is formed in the same shape as the outer peripheral edge of the C-type IP 45, and holds the middle portion of the C-type IP 45.

Figure 11:
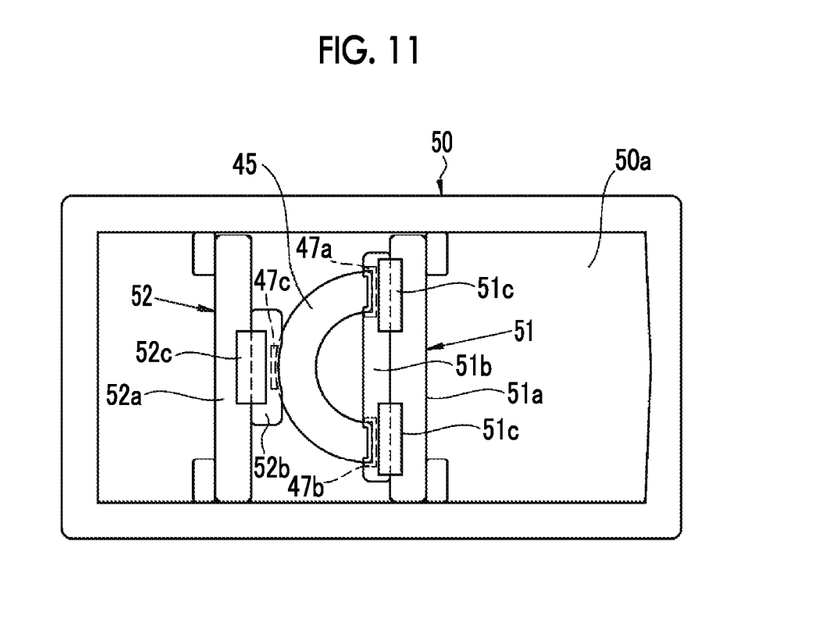
FIG. 11 is a plan view showing a state in which the C-type IP of the second embodiment is set to a template and the IP presser is closed.

As shown in FIG. 11, the first IP presser 51 includes a first fixed plate portion 51a, a first movable plate portion 51b, and hinge tapes 51c and presses both end portions of the C-type IP 45, which is held by both the end guide pieces 47a and 47b, from above. The first fixed plate portion 51a is fixed to a base plate 50a, and the first movable plate portion 51b is joined to the first fixed plate portion 51a through the hinge tapes 51c. The hinge tapes 51c hold the first movable plate portion 51b so that the first movable plate portion 51b can freely oscillate. The first movable plate portion 51b is displaced between an open state (see FIG. 10) in which the first movable plate portion 51b is retreated so as to be spaced apart from both the end guide pieces 47a and 47b and a closed state (see FIG. 11) in which the first movable plate portion 51b covers a part of both the end guide pieces 47a and 47b and prevents the separation of the C-type IP 45.

The second IP presser 52 includes a second fixed plate portion 52a, a second movable plate portion 52b, and a hinge tape 52c and presses the middle portion of the C-type IP 45. Holding portions 53, which are reduced in thickness by the thickness of the C-type IP 45, are formed on the back of the IP presser 51 and a holding portion 54, which is reduced in thickness by the thickness of the C-type IP 45, is formed on the back of the IP presser 52, and the guide pieces 47a to 47c and edge portions of the C-type IP 45 are housed in the holding portions 53 and 54. Since each of the first and second movable plate portions 51b and 52b is formed of a magnet plate having a magnetic force, the C-type IP 45 can be closely attached to the base plate 50a by a magnetic force in the closed state. In this way, three portions, that is, both end portions and the middle portion of the C-type IP 45 can be reliably pressed by the first and second IP pressers 51 and 52.

Various templates corresponding to the shapes of the IPs 21, 45, 59, and 69 are used. For example, two rectangular IPs 59 (9×12 inches) can be simultaneously held on a template 60 of a third embodiment shown in FIGS. 12 and 13. The template 60 includes two pairs of U-shaped guide pieces 61 and two pairs of IP pressers 62 that are provided on a base plate 60a. Each of the IP pressers 62 includes a fixed plate portion 62a, a movable plate portion 62b that is formed of a magnet plate, and hinge tapes 62c. Further, a holding portion 63, which is reduced in thickness by the thickness of the IP, is formed on the back of the movable plate portion 62b.

Figure 14:
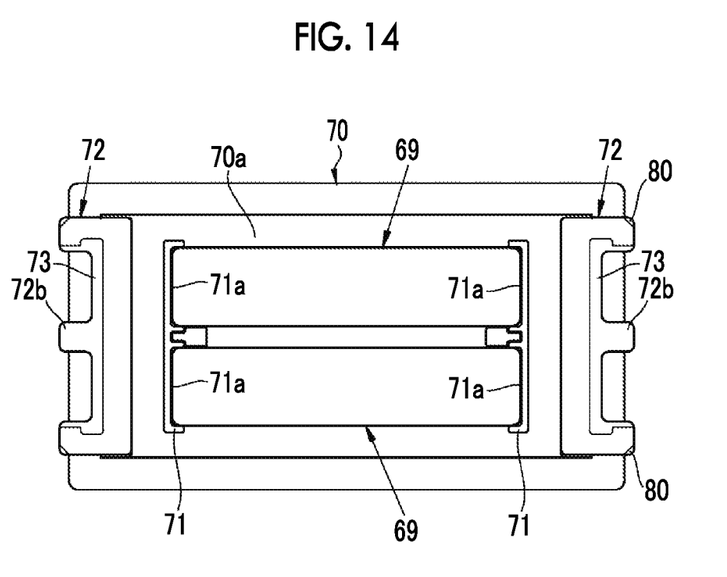
FIG. 14 is a plan view showing a state in which an IP presser is opened and an IP of a fourth embodiment is set to a template.
Figure 15:
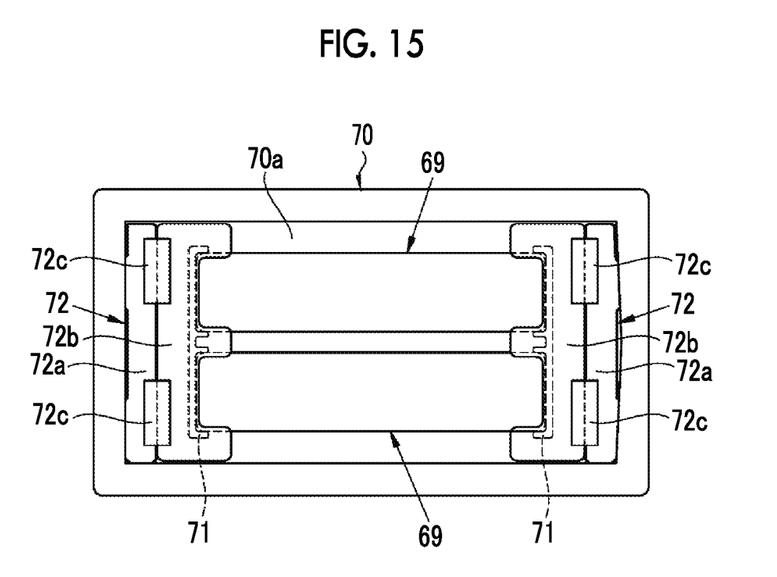
FIG. 15 is a plan view showing a state in which the IP of the fourth embodiment is set to the template and the IP presser is closed.

Two band plate-shaped IPs 69 (6×27 inches) can be simultaneously held on a template 70 of a fourth embodiment shown in FIGS. 14 and 15. The template 70 includes a pair of guide pieces 71 and a pair of IP pressers 72 that are provided on a base plate 70a. The basic structure of the template 70 is the same as that of the template 60. Each of the guide pieces 71 includes two U-shaped holding portions 71a, which hold end portions of the IPs 69 and are arranged side by side, and forms an IP positioning portion. Each of the IP pressers 72 includes a fixed plate portion 72a, a movable plate portion 72b that is formed of a magnet plate, and hinge tapes 72c. Further, a holding portion 73, which is reduced in thickness by the thickness of the IP, is formed on the back of the movable plate portion 72b.

Figure 12:
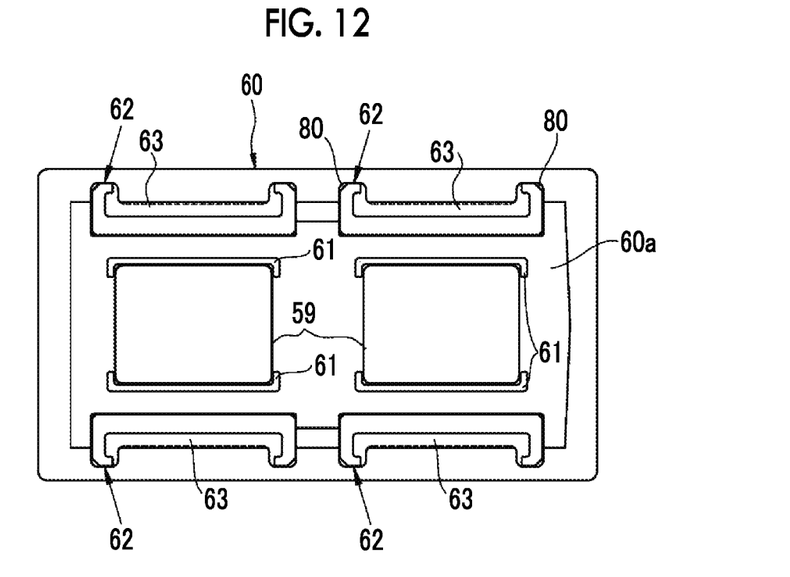
FIG. 12 is a plan view showing a state in which an IP presser is opened and an IP of a third embodiment is set to a template.
Figure 13:
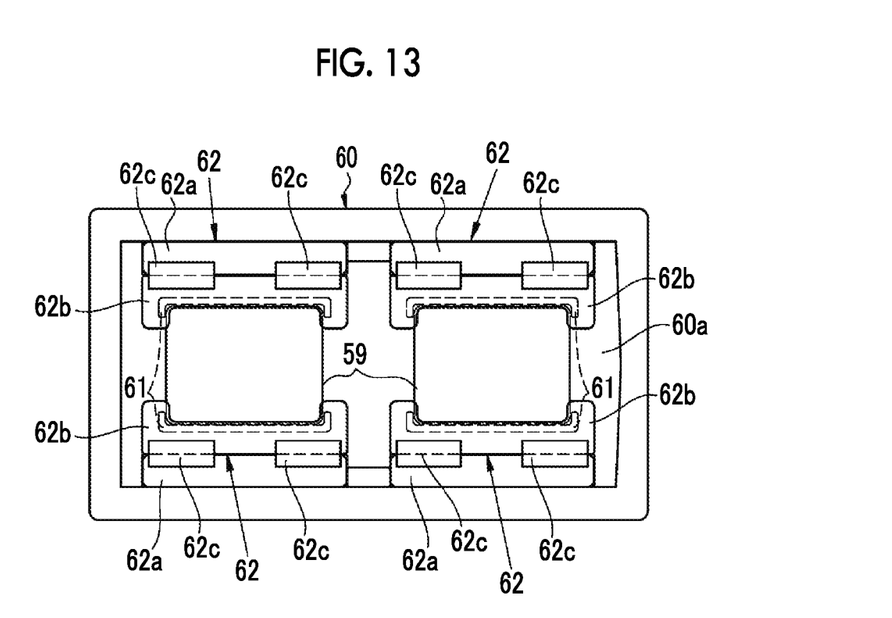
FIG. 13 is a plan view showing a state in which the IP of the third embodiment is set to the template and the IP presser is closed.

As shown in FIG. 6, a peeling recess 80 is formed on the base plate-close attachment surface of each of corners of the IP pressers 32 and 33. Since a fingernail or the like gets into the peeling recess 80, each of the movable plate portions 32b and 33b, which are closely attached to the base plate 30a in the closed state as shown in FIG. 7, can be reliably peeled from the base plate 30a so as to be in the open state. Both end portions of the holding portion 38 of the IP presser 31 functions as peeling recesses. The peeling recesses 80 are also formed on the other IP pressers 51, 52, 62, and 72 likewise as shown in FIGS. 10, 12, and 14. Since the peeling recesses 80 are formed at the corners of each of the IP pressers 32, 33, 51, 52, 62, and 72, each of the movable plate portions 32b, 33b, 51b, 52b, 62b, and 72b can be easily in the open state even though groping work is performed in a darkroom. Since a fingernail is locked to each of the holding portions 38, 40, 53, 54, 63, and 73, each of the movable plate portions 31b, 32b, 33b, 51b, 52b, 62b, and 72b can be easily in the open state likewise.

The templates 30, 50, 60, and 70 of the respective embodiments include the plurality of IP pressers 31 to 33, 51, 52, 62, and 72. The IP pressers hold the IP on the base plate, the stimulable phosphor layer 21b on which the inspection areas of the welded junction or the like are recorded as the latent image has only to generate stimulable luminescence, and the number of the IP pressers mounted has only to be 1 or more. The IP presser has included the movable plate portion that can oscillate. However, instead of this structure, an IP presser itself in which a movable plate portion and a fixed plate portion are integrated with each other may be formed of a magnet plate, and the IP presser may be detachably mounted on the base plate by a magnetic force to press the IP. Further, the movable plate portion has been be formed of a magnet and has been closely attached to the base plate by a magnetic force, but a movable plate portion may be closely attached to the base plate by using the elasticity of a flexible IP presser in which the movable plate portion and a fixed plate portion are integrated with each other.

Furthermore, although not shown, a protective sheet formed of a transparent sheet may be mounted on each of the templates 30, 50, 60, and 70 so that one side of the protective sheet is fixed to a side edge portion of the base plate. In this case, the protective sheet is formed of a transparent sheet so that the stimulable luminescence of the stimulable phosphor layer 21b is possible.

In the first embodiment, the radiation absorbing plate 24 has been formed of a magnetic body. However, instead of this structure, a close attachment plate, which is separate from the radiation absorbing plate and is formed of a magnetic body, may be used. Further, in a case in which an inspection target does not respond to a magnetic force, the radiation absorbing plate 24 may be pressed against the inspection area by basing using a spring or the like.

In the first embodiment, the IP 21 and the IP cover 22 have been positioned by the fold line of the folded portion 22b and the connection portions 22c. However, the IP 21 and the IP cover 22 may be positioned by the fitting between positioning pins (not shown) provided on the IP cover 22 and positioning holes (not shown) formed in the IP 21. In addition, although not shown, the pressing plate 23 and the radiation absorbing plate 24 may be positioned on the IP cover 22 by positioning pins.

The folded portion 22b has bee provided on the IP cover 22 in the first embodiment, but may be omitted. Further, a clip may be provided on the folded portion 22b to reliably hold the IP 21.

Figure 16:
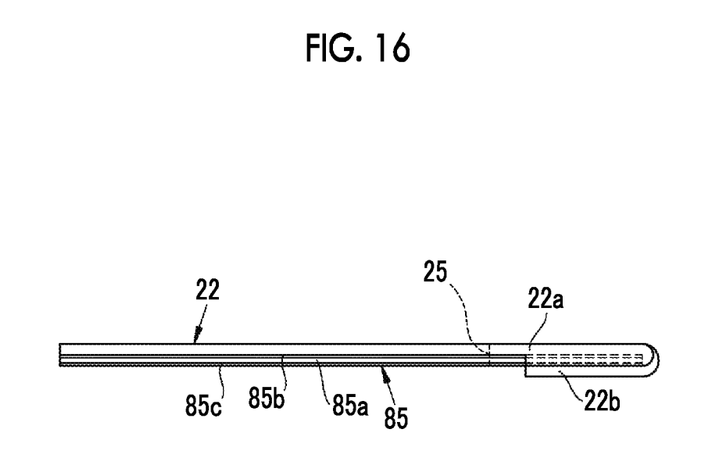
FIG. 16 is a side view showing an IP of another embodiment, which includes a magnet layer on a plate body, and the IP cover.

As shown in FIG. 16, an IP 85 including a magnet layer 85c may be used. The IP 85 includes a stimulable phosphor layer 85b that is provided on one surface of a plate body 85a formed of a flexible light-shielding sheet and a magnet layer 85c that is provided on the surface of the plate body 85a opposite to the stimulable phosphor layer 85b. The IP 85 is housed in the IP cover 22 and the stimulable phosphor layer 85b is protected by being covered with the IP cover 22. The same components as those of the embodiment will be denoted by the same reference numerals as those of the embodiment, and the repeated description thereof will be omitted. The magnet layer 85c has been provided on the plate body 85a in the shape of a layer, but a magnet plate, which is separately provided, may be attached to the plate body 85a and may be used as the magnet layer 85c. Further, the IP 85 may include two layers in which magnet powder is mixed to the plate body, instead of a three-layer structure including the plate body 85a, the stimulable phosphor layer 85b, and the magnet layer 85c.

When the IP 85 including the magnet layer 85c is used, the IP 85 can be more closely attached to an inspection target during non-destructive inspection. In addition, since various IP pressers and various guide pieces provided on the templates 30, 50, 60, and 70 can be omitted, the structure of the template can be simplified. The templates 30, 50, 60, and 70 including the above-mentioned IP pressers and the above-mentioned guide pieces may be used. In this case, the close attachment of the IP 85 with the templates 30, 50, 60, and 70 is improved. Further, since the close attachment of the IP 85 with an inspection target is improved, the pressing plate 23 may be omitted at the time of non-destructive inspection.

EXPLANATION OF REFERENCES

- 10: radiographic imaging system
- 11: IP unit
- 12: radiation irradiation device
- 13: radiation image reading device
- 21, 45, 59, 69, 85: IP
- 21a, 85a: plate body
- 21b, 85b: stimulable phosphor layer
- 22: IP cover
- 22a: cover body
- 22b: folded portion
- 22c: connection portion
- 23: pressing plate
- 24: radiation absorbing plate
- 25: notch
- 25a: notch opening portion
- 26: impeller
- 26a: blade welded portion
- 29: blade
- 30, 50, 60, 70: template
- 30a: base plate
- 31 to 33, 51, 52, 62, 72: IP presser
- 85c: magnet layer

What is claimed is:

1. An imaging plate unit comprising:
   an imaging plate that includes a stimulable phosphor layer on one surface thereof and has a shape allowing the imaging plate to be mounted on an inspection target so as to be closely attached to the inspection target; and
   an imaging plate cover that is attachably and detachably mounted on the imaging plate so as to be closely attached to a surface of the stimulable phosphor layer of the imaging plate and has a light-shielding property,
   wherein the imaging plate and the imaging plate cover include notches into which a part of the inspection target is inserted, and
   wherein the stimulable phosphor layer is closely attached to the inspection target with the imaging plate cover interposed between the stimulable phosphor layer and the inspection target in a state in which a part of the inspection target is inserted into the notches.

2. The imaging plate unit according to claim 1,
   wherein the imaging plate cover includes a cover body that has the same outer shape as the imaging plate, and a folded portion that extends from the cover body and allows a part of an outer peripheral edge of the imaging plate to be sandwiched by the folded portion and the cover body.

3. The imaging plate unit according to claim 2,
   wherein the imaging plate includes an abutting end portion,
   the imaging plate cover includes a receiving portion that receives the abutting end portion, and
   the imaging plate cover and the imaging plate overlap each other and are positioned in a state in which the abutting end portion abuts against the receiving portion.

4. The imaging plate unit according to claim 3, further comprising:
   a magnet layer that is provided on a surface of the imaging plate opposite to the stimulable phosphor layer.

5. The imaging plate unit according to claim 4, further comprising:
   a radiation absorbing plate that is mounted on the magnet layer so as to be closely attached to the magnet layer.

6. The imaging plate unit according to claim 2, further comprising:
   a magnet layer that is provided on a surface of the imaging plate opposite to the stimulable phosphor layer.

7. The imaging plate unit according to claim 6, further comprising:
   a radiation absorbing plate that is mounted on the magnet layer so as to be closely attached to the magnet layer.

8. The imaging plate unit according to claim 1,
   wherein the imaging plate includes an abutting end portion,
   the imaging plate cover includes a receiving portion that receives the abutting end portion, and
   the imaging plate cover and the imaging plate overlap each other and are positioned in a state in which the abutting end portion abuts against the receiving portion.

9. The imaging plate unit according to claim 8, further comprising:
   a magnet layer that is provided on a surface of the imaging plate opposite to the stimulable phosphor layer.

10. The imaging plate unit according to claim 9, further comprising:
    a radiation absorbing plate that is mounted on the magnet layer so as to be closely attached to the magnet layer.

11. The imaging plate unit according to claim 1, further comprising:
    a magnet layer that is provided on a surface of the imaging plate opposite to the stimulable phosphor layer.

12. The imaging plate unit according to claim 11, further comprising:
    a radiation absorbing plate that is mounted on the magnet layer so as to be closely attached to the magnet layer.

13. The imaging plate unit according to claim 1, further comprising:
    a pressing plate that is mounted on a surface of the imaging plate opposite to the stimulable phosphor layer so as to be closely attached to the imaging plate.

14. The imaging plate unit according to claim 13, further comprising:
    a radiation absorbing plate that is mounted on a surface of the pressing plate opposite to the imaging plate so as to be closely attached to the pressing plate.

15. The imaging plate unit according to claim 14,
    wherein the radiation absorbing plate has a magnetic force, so that the imaging plate cover and the imaging plate are made to be closely attached to an inspection area.

16. The imaging plate unit according to claim 1, wherein the notches included in the imaging plate and the notches included in the imaging plate cover have same shape and same size as each other.

17. A radiographic imaging apparatus comprising:
an imaging plate unit according to claim 1; and
a radiation irradiation device that irradiates the inspection target with radiation and takes a radiation image on the imaging plate by radiation having passed through the inspection target.

18. A radiographic imaging method comprising:
irradiating an inspection target with radiation applied from a radiation source by using an imaging plate unit according to claim 1; and
taking a radiation image on the imaging plate by radiation having passed through the inspection target.

* * * * *